US012537007B2

(12) United States Patent
Pan et al.

(10) Patent No.: US 12,537,007 B2
(45) Date of Patent: Jan. 27, 2026

(54) METHOD FOR DETECTING AIRCRAFT AIR CONFLICT BASED ON SEMANTIC PARSING OF CONTROL SPEECH

(71) Applicant: CIVIL AVIATION FLIGHT UNIVERSITY OF CHINA, Guanghan (CN)

(72) Inventors: Weijun Pan, Guanghan (CN); Yao Zheng, Guanghan (CN); Zixuan Wang, Guanghan (CN); Xuan Wang, Guanghan (CN); Qinghai Zuo, Guanghan (CN); Rundong Wang, Guanghan (CN); Tian Luan, Guanghan (CN); Yidi Wang, Guanghan (CN); Boyuan Han, Guanghan (CN)

(73) Assignee: CIVIL AVIATION FLIGHT UNIVERSITY OF CHINA, Guanghan (CN)

( * ) Notice: Subject to any disclaimer, the term of this patent is extended or adjusted under 35 U.S.C. 154(b) by 0 days.

(21) Appl. No.: 19/024,112

(22) Filed: Jan. 16, 2025

(65) Prior Publication Data
US 2025/0342839 A1  Nov. 6, 2025

(30) Foreign Application Priority Data
Apr. 24, 2024  (CN) .......................... 202410496585.4

(51) Int. Cl.
*G10L 15/16*    (2006.01)
*G08G 5/20*     (2025.01)
(Continued)

(52) U.S. Cl.
CPC ............... *G10L 15/26* (2013.01); *G08G 5/20* (2025.01); *G08G 5/80* (2025.01); *G10L 15/16* (2013.01);
(Continued)

(58) Field of Classification Search
CPC . G10L 15/16; G10L 15/1815; G10L 15/1822; G10L 15/22; G10L 15/26;
(Continued)

(56) References Cited

U.S. PATENT DOCUMENTS 7,881,932 B2 *  2/2011  Muschett .............. G06F 40/143
                                            704/270.1
10,818,192 B2  10/2020  Chen et al.
(Continued)

FOREIGN PATENT DOCUMENTS

CN       205810140 U  * 12/2016
CN       106875948 A    6/2017
(Continued)

OTHER PUBLICATIONS

Swierstra, Sip. "Design of decision making aids for ATC systems." AGARD-AG-321. (Year: 1994).*
(Continued)

*Primary Examiner* — Paras D Shah
*Assistant Examiner* — Oluwadamilola M Ogunbiyi
(74) *Attorney, Agent, or Firm* — Pilloff Passino & Cosenza LLP; Rachel K. Pilloff; Sean A. Passino

(57) ABSTRACT

A method for detecting aircraft flight conflict based on semantic parsing of control speech is provided. Firstly, the control speech is collected in real time, and the speech is converted into text through the control speech identification system combined with real-time radar data; inputting the identified control text into the control text intention identification model, further analyzing the intention, and judging whether the identified control text intention needs to change the flight state of the aircraft, if not, terminating the detection, and if necessary, extracting control instructions; extracting the key data needed for conflict detection from the identified control text; according to the key data and real-
(Continued)

time radar data, performing the conflict detection algorithm to judge whether there is flight conflict; if it exists, a conflict alarm mechanism is triggered.

3 Claims, 4 Drawing Sheets

(51) Int. Cl.
*G08G 5/80* (2025.01)
*G10L 15/18* (2013.01)
*G10L 15/22* (2006.01)
*G10L 15/26* (2006.01)
*G10L 15/08* (2006.01)

(52) U.S. Cl.
CPC ...... *G10L 15/1815* (2013.01); *G10L 15/1822* (2013.01); *G10L 15/22* (2013.01); *G10L 2015/088* (2013.01); *G10L 2015/223* (2013.01)

(58) Field of Classification Search
CPC ........ G10L 2015/088; G10L 2015/223; G08G 5/20; G08G 5/80
See application file for complete search history.

(56) References Cited

U.S. PATENT DOCUMENTS

| | | | | |
|---|---|---|---|---|
| 11,862,031 | B1* | 1/2024 | George | G10L 15/26 |
| 2008/0262843 | A1* | 10/2008 | Katsuragawa | G10L 15/08 |
| | | | | 704/E15.005 |
| 2013/0159000 | A1* | 6/2013 | Ju | G10L 15/1822 |
| | | | | 704/E15.005 |
| 2015/0331666 | A1* | 11/2015 | Bucsa | G06F 3/167 |
| | | | | 704/275 |
| 2017/0301247 | A1* | 10/2017 | Sherry | G08G 5/21 |
| 2018/0342237 | A1* | 11/2018 | Lee | G10L 15/26 |
| 2019/0014461 | A1* | 1/2019 | Winkle | G08G 5/57 |
| 2020/0013407 | A1* | 1/2020 | Chae | G06F 3/167 |
| 2020/0241575 | A1* | 7/2020 | Meisenholder | G10L 15/25 |
| 2020/0335084 | A1* | 10/2020 | Wang | G10L 21/0364 |
| 2020/0411002 | A1* | 12/2020 | Lee | G06F 11/3423 |
| 2021/0183360 | A1* | 6/2021 | Ebrahimifard | G08G 5/51 |
| 2021/0233411 | A1* | 7/2021 | Saptharishi | G08G 5/53 |
| 2021/0362543 | A1* | 11/2021 | Howard | B60T 8/1761 |
| 2023/0154460 | A1* | 5/2023 | Norton, Jr. | G06F 3/167 |
| | | | | 704/275 |
| 2023/0267843 | A1* | 8/2023 | Permiakov | G08G 5/56 |
| | | | | 701/120 |
| 2023/0386347 | A1* | 11/2023 | Parker | G08G 5/55 |
| 2024/0059248 | A1* | 2/2024 | Guo | G07C 9/00309 |
| 2024/0249726 | A1* | 7/2024 | Boswell | G10L 15/32 |
| 2025/0118300 | A1* | 4/2025 | Markas | G06F 3/013 |

FOREIGN PATENT DOCUMENTS

| | | | | |
|---|---|---|---|---|
| CN | 107492266 | A | 12/2017 | |
| CN | 110580052 | A * | 12/2019 | ............ G05D 1/101 |
| CN | 111444343 | A | 7/2020 | |
| CN | 116386637 | A * | 7/2020 | ............ G10L 15/22 |
| CN | 112559738 | A | 3/2021 | |
| CN | 115905539 | A | 4/2023 | |
| EP | 2469291 | A1 * | 6/2012 | ........... G01S 5/0072 |
| WO | WO2023050935 | A1 | 4/2023 | |

OTHER PUBLICATIONS

Yun-Xiang, Han, and Huang Xiao-Qiong. "Modeling of air traffic flow using cellular automata." IEEE Transactions on Aerospace and Electronic Systems 58.4 (2021): 2623-2631. (Year: 2021).*
Abas, Ahmed R., et al. "BERT-CNN: A Deep Learning Model for Detecting Emotions from Text." Computers, Materials & Continua 71.2 (2022). (Year: 2022).*
Shen, Lu, et al. "Self-attention-based Transformer for nonlinear maneuvering target tracking." IEEE Transactions on Geoscience and Remote Sensing 61 (2023): 1-13. (Year: 2023).*
Yu, Zhou, Xingyu Shi, and Zhaoning Zhang. "A multi-head self-attention transformer-based model for traffic situation prediction in terminal areas." IEEE Access 11 (2023): 16156-16165. (Year: 2023).*
Chakraborty, Sabyasachi, et al. "Intent classification of users conversation using BERT for conversational dialogue system." 2023 25th International Conference on Advanced Communication Technology (ICACT). IEEE, 2023. (Year: 2023).*
Retrieval report—First search dated May 21, 2024 in SIPO application No. 202410496585.4.
Retrieval report—Supplementary search dated Jun. 7, 2024 in SIPO application No. 202410496585.4.
Notification to Grant Patent Right for Invention dated Jun. 13, 2024 in SIPO application No. 202410496585.4.
Notice of first Office action dated May 27, 2024 in SIPO application No. 202410496585.4.
Zixuan Wang, et al., BERT-BILSTM-CRF Based Named Entity Recognition Method for Controlled Speech 2023 6th International Conference on Artificial Intelligence and Big Data(ICAIBD), Aug. 10, 2023, pp. 270-275 DOI: 10.1109/ICAIBD57115.2023. 10206084 Claims involved: 1-6.
Xuan Wang, et al., An ATC instruction processing-based trajectory prediction algorithm designing, Neural Computing and Applications, Jan. 30, 2021, vol. 35, pp. 23477-23490, doi: 10.1007/s00521-021-05713-4 Claims involved: 1-6.
Yiming Bao, Design and Implementation of Domain Intelligent Q&A SystemBased on Deep Learning, Chinese Master's Theses Full-text Database(CMFD) Information technology series, Feb. 15, 2023, pp. 1138-3846,No. 2 Claims involved: 1-6.
Xiangming Dong, et al., Intention Recognition Method of Power Grid Dispatching professional language Based on Hybrid Neural Networks, 2022 9th International Forum on Electrical Engineering and Automation (IFEEA), Feb. 10, 2023, pp. 1236-1240; DOI: 10.1109/IFEEA57288.2022.10038008 Claims involved: 1-6.

* cited by examiner

METHOD FOR DETECTING AIRCRAFT AIR CONFLICT BASED ON SEMANTIC PARSING OF CONTROL SPEECH

CROSS-REFERENCE TO RELATED APPLICATIONS

This application claims priority to Chinese Patent Application No. 202410496585.4, filed on Apr. 24, 2024, the contents of which are hereby incorporated by reference.

TECHNICAL FIELD

The disclosure relates to the technical field of flight conflict detection, and in particular to a method for detecting aircraft air conflict based on semantic parsing of control speech.

BACKGROUND

In the aviation field, safety is always the highest priority. With the increase of the number of aircraft and the complexity of air traffic, the air conflict between aircraft has become a problem that needs to be paid attention to. The conventional method of aircraft air conflict detection mainly depends on real-time flight data, and the response time is limited, which may lead to the untimely handling of emergency situations. Meanwhile, speech is the main way of communication between controllers and pilots, but the conventional speech processing method has some limitations, and may not make full use of speech information for conflict detection.

At present, aircraft air conflict detection algorithms are mainly based on real-time flight data and air traffic control data to evaluate the relative position and dynamic behavior between aircraft. However, using real-time flight data and air traffic control data may not detect the impending conflict in advance, which leads to insufficient response time, and once the response is not timely, it may bring irreparable losses.

In recent research, a new method of aircraft air conflict detection using control speech is proposed. Firstly, speech identification is carried out on the control speech; secondly, template matching method is used to extract control instructions; finally, the conventional conflict detection algorithm is used for conflict detection. This method requires high accuracy of speech identification, because a identification error may affect the subsequent instruction extraction, thus reducing the accuracy of conflict detection, so the requirement of high quality of speech processing becomes a key factor to ensure the reliability of the method.

The prior art has the following problems.

1. Because the existing aircraft air conflict detection mainly relies on real-time flight data, it is difficult to predict the upcoming conflict in advance, which leads to the very limited response time of the system and the extremely high response requirements for controllers and pilots.
2. At present, the conflict detection method based on control speech fails to predict the text of control speech before processing, which leads to the need for the system to extract instructions from all control speech texts, thus increasing the time for conflict detection.
3. The existing conflict detection methods based on control speech use template matching to extract instructions for conflict detection. However, once the speech identification error occurs, the extraction of key instructions may be affected, which will have a negative impact on the subsequent burst detection.
4. At present, many conflict detection methods are inferred by speed formula, which has high complexity, thus leading to an increase in conflict detection time.

SUMMARY

In view of the above problems, the object of the present disclosure is to provide a method for detecting aircraft air conflict based on semantic parsing of control speech, which may reduce the influence on instruction extraction caused by speech identification errors, reduce the possibility that control instructions cannot be accurately identified, and provide more accurate data for subsequent conflict detection. The technical scheme is as follows:

the disclosure relates to a method for detecting aircraft air conflict based on semantic parsing of control speech, including the following steps:

step 1: collecting control speech in real time, and combining with real-time radar data, performing a speech-to-text processing on the control speech to identify a control speech text;

step 2: identifying a control speech text intention according to an identified control speech text, judging whether the identified control speech text intention needs to change a flight state of an aircraft, and if the flight state does not need to be changed, the detection is terminated; if the flight state needs to be changed, a next control instruction is extracted;

step 3: in a control instruction extraction stage, extracting key data needed by an aircraft air conflict detection algorithm from the identified control speech text; and step 4: performing a calculation according to the key data and the real-time radar data and using the aircraft air conflict detection algorithm to judge whether the aircraft air conflict is existed at present; if the aircraft air conflict is not detected, a whole process ends; if the aircraft air conflict is existed, an aircraft air conflict warning mechanism is triggered to remind relevant personnel to take necessary measures.

Compared with the prior art, the disclosure has the following beneficial effects:

First, the method may provide more sufficient time for aircraft air conflict resolution: by using control speech to detect aircraft air conflict, the aircraft air conflict detection method based on semantic parsing of control speech may extract conflict information in advance, providing more time for pilots and controllers to formulate and implement conflict resolution schemes, ensuring that relevant personnel may respond more timely when aircraft air conflict occurs, reducing the risks caused by potential aircraft air conflict and improving the safety of the entire aviation communication system.

Second, the method may improve the efficiency of aircraft air conflict detection: by introducing the intention identification of control speech text, the control speech may be judged before the flight state changes, thus reducing the workload of aircraft air conflict detection; the method improves the efficiency of aircraft air conflict detection and avoids redundant judgment of every released control speech.

Third, the method may improve the robustness of aircraft air conflict detection: the deep learning model is used to extract key words from the control speech text, which effectively avoids the failure of keyword extraction that may be caused by the error of control speech identification; the robustness of aircraft air conflict detection is improved, and the accurate extraction of key information is ensured.

Fourth, the method may reduce the computational burden of aircraft air conflict detection: the same pre-training model is used in the stage of intention identification and keyword extraction of control speech text to deal with different downstream tasks, thus reducing the computational burden; the method improves the overall efficiency of aircraft air conflict detection and makes it possible to share models among different tasks.

Fifth, the method may improve the speed of aircraft air conflict detection: the route is abstracted into computer resources for aircraft air conflict detection, and the rapid judgment of aircraft air conflict is realized; the method provides a more intuitive and efficient method to abstract the complex situation of aviation territory into a processable form of computer system.

DETAILED DESCRIPTION OF THE EMBODIMENTS

The disclosure will be further described in detail with the attached drawings and specific embodiments.

Figure 1:
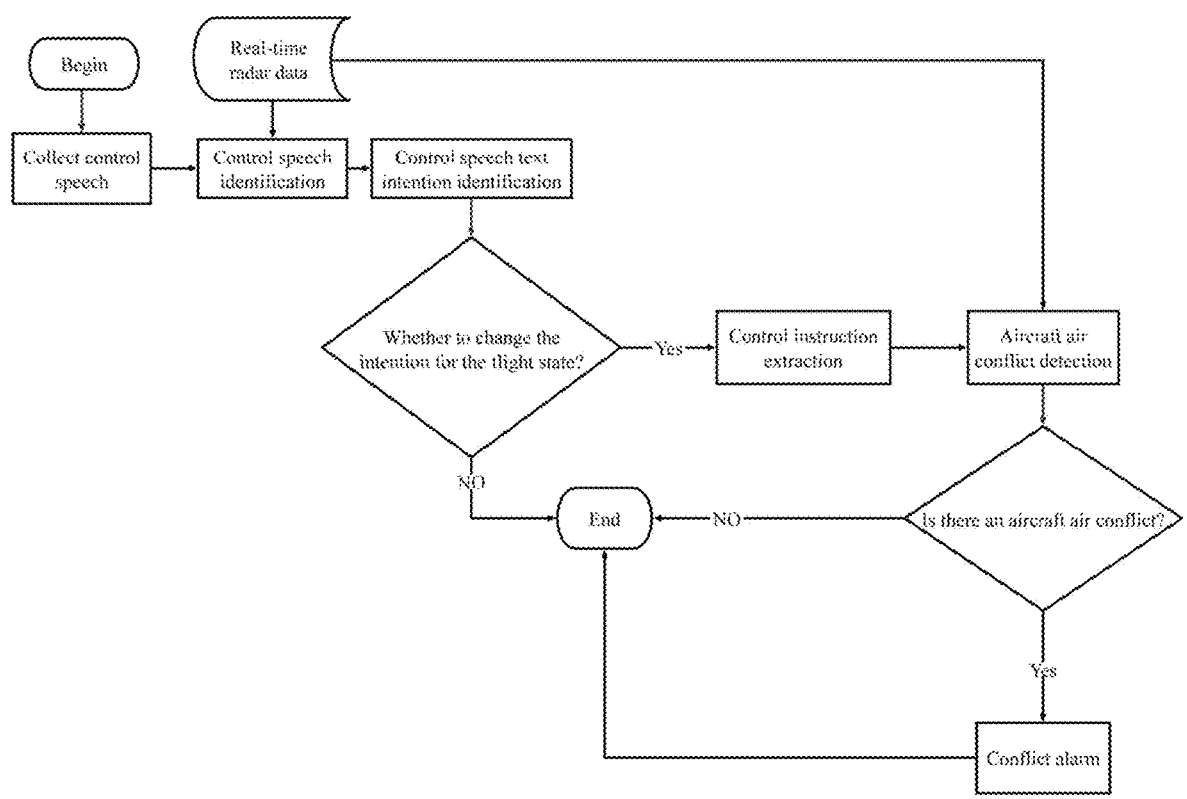
FIG. 1 is a flow chart of a method for detecting aircraft air conflict based on semantic parsing of control speech.

The disclosure aims to provide a method for detecting aircraft air conflict based on semantic parsing of control speech, which may improve the efficiency and accuracy of aircraft air conflict detection by making full use of control speech information (as shown in FIG. 1). FIG. 1 is a flowchart of the aircraft air conflict detection method based on semantic parsing of control speech.

Firstly, the control speech is collected in real time, and the speech is converted into text by combining the control speech identification system with real-time radar data. Then, the identified control speech text is input into the intention identification model of control speech text, and the intention is further analyzed; in this step, it is necessary to judge whether the identified control voice text intention requires the aircraft to change the flight state, and if it is not necessary to change the flight state, the detection is terminated; if the flight state needs to be changed, the next control instruction extraction is carried out. In the stage of control instruction extraction, the control instruction extraction model extracts the key data needed by the aircraft air conflict detection algorithm from the identified control speech text. These data and real-time radar information will be sent to the aircraft air conflict detection algorithm to judge whether there is an aircraft air conflict at present. If the aircraft air conflict is not detected, the whole process ends; if there is an aircraft air conflict, the aircraft air conflict warning system will trigger the aircraft air conflict warning mechanism to remind relevant personnel to take necessary measures.

Through this comprehensive process, the aircraft air conflict detection method based on intelligent speech processing may collect and process the control speech in real time, and realize the control speech text intention identification, control instruction extraction and aircraft air conflict detection based on the control speech text intention identification model, control instruction extraction model and aircraft air conflict detection algorithm, and finally issue a conflict alarm when necessary. This process may improve the efficiency and accuracy of aircraft air conflict detection, which is obviously innovative and practical.

1) Control Speech Collection

The disclosure adopts external speech acquisition equipment, which is embedded with a Bluetooth transmission module, thus realizing the real-time acquisition of control speech. Through this device, the collected control speech may be immediately transmitted to the back-end server for further analysis and calculation. The use of this technology ensures the efficient processing and accurate identification of control speech.

Bluetooth transmission module of external speech acquisition equipment not only provides real-time, but also facilitates the overall flexibility and portability of the system. This innovative design ensures that the collected speech data may be quickly transmitted to the back-end server in a large range, which provides timely input for the subsequent speech processing steps.

2) Control Speech Identification

The control speech collected by external acquisition equipment is put into the control speech identification system for identification. In the design of the control speech identification system, the present disclosure adopts the previous control speech to train the existing mature speech identification system. Through this step, a speech identification system dedicated to speech control is obtained, which may identify the controller's instructions more accurately. In order to further improve the accuracy of control speech identification, the disclosure introduces real-time radar information in the identification process. This innovative measure enables the system to combine the control speech and radar information to narrow the identification range, thus improving the accuracy of control speech identification.

3) Control Speech Text Intention Identification

A, the intention of control speech text during the area control phases is classified, and whether the intention of control speech text needs to change the flight state of the aircraft is defined. The classification table of control speech text intention is shown in Table 1:

TABLE 1

| Classification table of control speech text intention | | |
| --- | --- | --- |
| Control speech text | Examples | Whether to change the flight state |
| Flight level adjustment | CSN8735, climb and maintain 9200 meters | YES |
| Speed adjustment | CSN8735, reduce speed to Mach number 0.75, due separation/front sector | YES |

TABLE 1-continued

Classification table of control speech text intention

| Control speech text | Examples | Whether to change the flight state |
|---|---|---|
| Heading adjustment | requirements/arrival interval . . . CSN8735, radar vector, turn right heading 360 due separation . . . | YES |
| Lateral offset | CSN8735, turn right 30 degrees for heading 120, proceed offset 3 miles right/left of track . . . | YES |
| Traffic information and avoiding action | CSN8735, traffic 12 o'clock 20 kilometers, B737, same direction, above you, pay attention. | NO |
| Radar identification | CSN 8735, Beijing control, radar identified/radar contact. | NO |
| Transfer of communication | CSN8735, radar service terminated, contact Guangzhou on 118.9. | NO |

Figure 2:
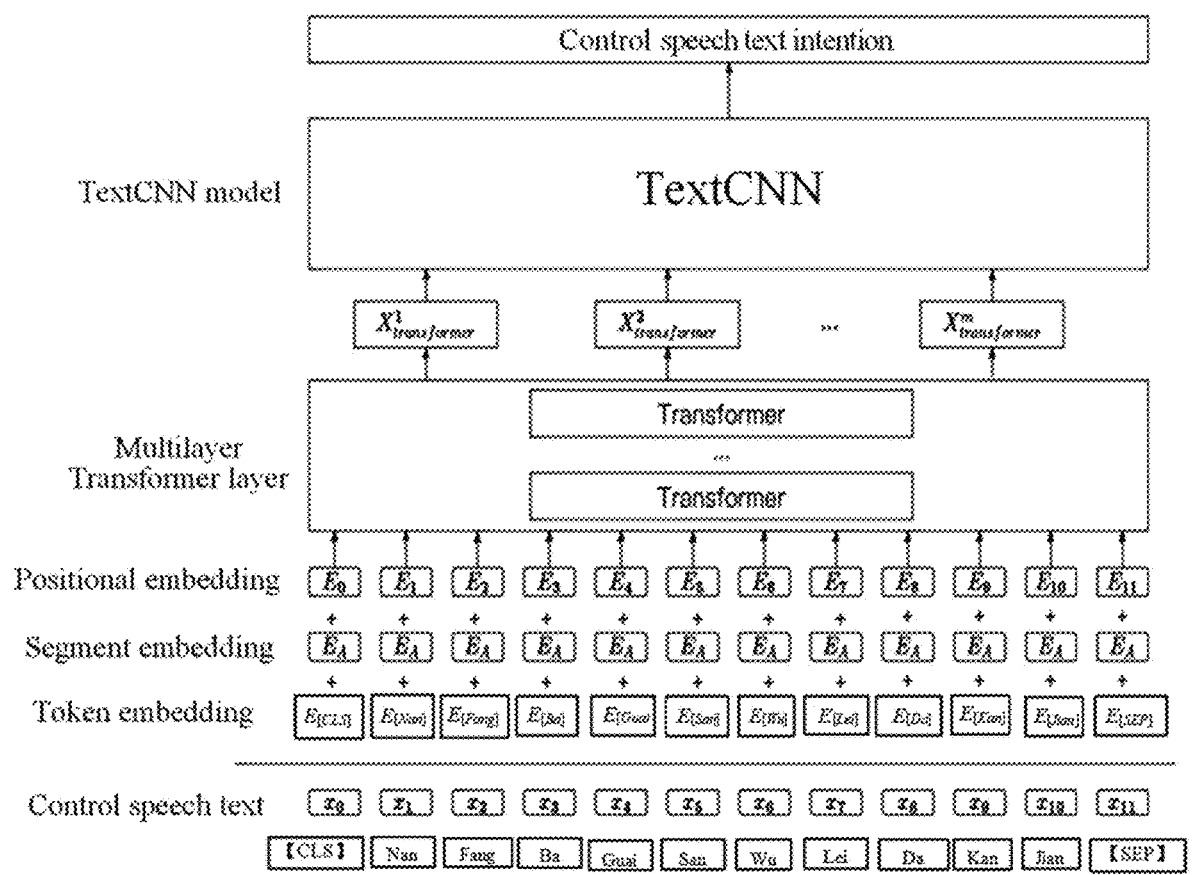
FIG. 2 is the structure diagram of BERT+TextCNN model.

B, as shown in FIG. 2, the early collected and stored control speech text historical data are labeled according to the classification table of the control speech text intention, and the BERT+TextCNN model is trained by using the labeled control speech text historical data; the trained BERT+TextCNN model is used to identify the intention of the regulated speech text identified by the regulated speech identification system.

The specific work flow of that disclosure is as follows:

a. Inputting the control speech text for text preprocessing: preprocessing a control speech text $X=[x_0, x_1, \ldots, x_n]$, comprising converting into token embeddings, positional embeddings and segment embeddings, and finally adding the token embeddings, the positional embeddings and the segment embeddings to obtain a combined embedding;

the token embeddings: mapping each word or sub-word into the token embeddings;

$$E_e = E[\text{index}(x_i)];$$

where $E_e$ represents the token embeddings; $x_i$ represents the word or the sub-word in the control speech text; index represents an index that the word or the sub-word $x_i$ in the control speech text is mapped to a token embedding matrix; E represents the token embedding matrix, where each row corresponds to a word vector representation of the word or the sub-word; subscript e represents embedded text.

the positional embeddings: considering position information of the word, add the positional embedding;

$$E_p = P[x_i];$$

where $E_p$ represents the positional embeddings; P represents a positional embedding matrix, where each row corresponds to a position vector representation of a position; the subscript p represents the position serial number, and usually adopts a fixed position coding, such as 0, 1, . . . .

Segment embeddings: distinguishing different paragraphs or sentences in the input control speech text;

$$E_s = S[\text{segment\_index}(X)];$$

Where $E_s$ represents the segment embeddings; S represents a segment embedding matrix, where each row corresponds to a segment vector representation of a segment; segment_index represents a function for accepting input control speech text X and returning a segment index to which each word or the sub-word belongs; the subscript s represents segments and is used to distinguish different segments, for example, using A, B, . . . .

Combined embedded representation:

$$X_{incoder} = E_e + E_p + E_s;$$

where $X_{incoder}$ represents the combined embeddings.

b. BERT model processing:

inputting a preprocessed control speech text into a BERT model to obtain a context-aware vector representation; the BERT model includes a multiple of Transformer layers, and each layer includes a multi-head self attention mechanism and a feedforward neural network;

multi-head self attention mechanism:

in the multi-head self attention mechanism, each input word is associated with other words, and a weight is determined by an attention score; the multi-head self attention mechanism captures different relationships through a multiple of attention heads, as the following formulas:

$$\text{Attention}(Q, K, V) = \text{softmax}\left(\frac{QK^T}{\sqrt{d_k}}\right) \cdot V;$$

$$X_{head}^i(X) = \text{Attention}(X \cdot W_{Q_i}, X \cdot W_{K_i}, X \cdot W_{V_i});$$

$$X_{MultiHead}(X) = \text{Concat}(X_{head}^1(X), X_{head}^2(X), \ldots, X_{head}^i(X)) * W_o;$$

where $Q=X \cdot W_Q$, $K=X \cdot W_K$, $V=X \cdot W_V$, respectively represent matrices of query, key and value about the input vector control speech text; softmax represents an activation function; $W_Q$, $W_K$ and $W_V$ respectively represent weight matrices of the query, the key and the value; $d_k$ represents a dimension of each attention head; $W_O$ represents a weight matrix of a fully connected layer; T represents a transposed symbol;

$$X_{head}^i(X)$$

represents an output resun of an i-th self attention mechanism; Attention represents self attention operation; $W_{Q_i}$, $W_{K_i}$ and $W_{V_i}$ respectively represent weight matrices of query, key and value in the i-th self attention mechanism;

$X_{MultiHead}(X)$ represents an output of self attention mechanism; Concat represents a connection operation; * indicates a convolution operation;

the feedforward neural network:

after the multi-head self attention mechanism, nonlinear mapping is performed on the output by the feedforward neural network:

$$FFN(X) = ReLU(X_{MultiHead}(X) \cdot W_1 + b_1) \cdot W_2 + b_2;$$

where FFN represents the output through the feedforward neural network; ReLU represents an activation function; $X_{MultiHead}(X)$ represents the output of the self attention mechanism; $W_1$ and $W_2$ respectively represent weight matrices of the feedforward neural network; $b_1$ and $b_2$ respectively represent offset vectors of the feedforward neural network;

a final BERT model output is:

$$X_{transformer}^1 = FNN(X_{incoder})$$
$$X_{transformer}^m = FNN(X_{transformer}^{m-1})$$

where $$X_{transformer}^m$$

represents an output of an m-th Transformer layer.

c. TextCNN model:

inputting an output result of the BERT model into the TextCNN model; the TextCNN model includes a convolution layer, a pooling layer and the fully connected layer;

a) convolution layer operation:

$$c_k = ReLU\left(W * X_{transformer}^{[k:k+h-1]} + b\right)$$

where $c_k$ represents a convolution result; W represents a convolution kernel; b represents an offset vector of the convolution operation;

$$X_{transformer}^{[k:k+h-1]}$$

represents a sliding window operation on an output of the Transformer layers; for each position k in an output sequence of the Transformer layer, a subsequence from a position k to a position k+h−1 will be extracted as an input of the convolution operation; h represents a size of a sliding window;

pooling layer operation:

$$p_k = \max(c_{k:k+h-1});$$

where $p_k$ represents a result of the pooling operation; max represents the pooling operation; $c_{k:k+h-1}$ represents an output result of the convolution layer; k:k+h−1 represents a local area from the position k to k+h−1;

combining results of all pooling layer operations into a feature vector p:

$$p = [p_1, p_2, \ldots, P_{n-h+1}];$$

where $p_{n-h+1}$ represents a result of a last pooling operation; n represents a length of an input sequence; h represents a size of the sliding window, that is, features extracted from a sliding window starting from an h-th position from a bottom of the input sequence;

fully connected layer:

inputting the feature vector p into the fully connected layer to obtain:

$$y = \mathrm{softmax}(W_{FC} \cdot p + b_{FC});$$

where y represents an output of the fully connected layer; $W_{FC}$ represents a weight matrix of the fully connected layer; $b_{FC}$ represents an offset vector of the fully connected layer;

d. Training and fine-tuning:

using training data with a control speech text intention label, adjusting parameters of the BERT+TextCNN model by minimizing a loss function;

$$\mathcal{L} = -\sum_i \sum_j y_{i,j} \log(\hat{y}_{i,j});$$

where $\mathcal{L}$ represents a cross entropy loss; $y_{i,j}$ represents a real label; $\hat{y}_{i,j}$ represents a prediction probability of the BERT+TextCNN model.

e. Inference:

after completing the fine-tuning, using an adjusted BERT+TextCNN model to perform the inference on the control speech text identified in the step 1 to obtain a corresponding a control speech text intention classification result;

C. After obtaining the control speech text intention, judging whether to change the flight state according to the classification table of the control speech text inten tion, if the flight state does not need to be changed, the detection is terminated; if the flight state needs to be changed, the next control instruction is extracted.

4) Control Instruction Extraction

A, after identifying the control speech text intention and judging whether the intention changes the flight state, keyword extraction is carried out on the control speech text for changing the flight state.

According to the structure of control speech text, four types of keyword entities are designed for control speech text, namely call sign entity, instruction entity, numeral entity and quantifier entity. Firstly, the disclosure uses the method of BIO labeling to label the previous control speech text. In the labeling method of BIO, B, I and O represent Begin, Inner and Other respectively, and the part that belongs to the entity is labeled as B-X or I-X, where B-X is the beginning of X entity element, I-X represents the middle or end part of X entity, and other entities that do not belong to the entity class are represented by element O, and the labeling method is shown in Table 2:

TABLE 2

Examples of labeling methods

| Entity | Start label | Middle or end label | Example |
| --- | --- | --- | --- |
| Call sign entity | B-C | I-C | CSN3738, and CSZ9300 |
| Instruction entity | B-O | I-O | Climb, decent, hold |
| Numeral entity | B-N | I-N | 4800, 300 |
| Quantifier entity | B-M | I-M | miles, minutes |
| Other entities | O | O | Other statements include punctuation marks. |

Figure 3:
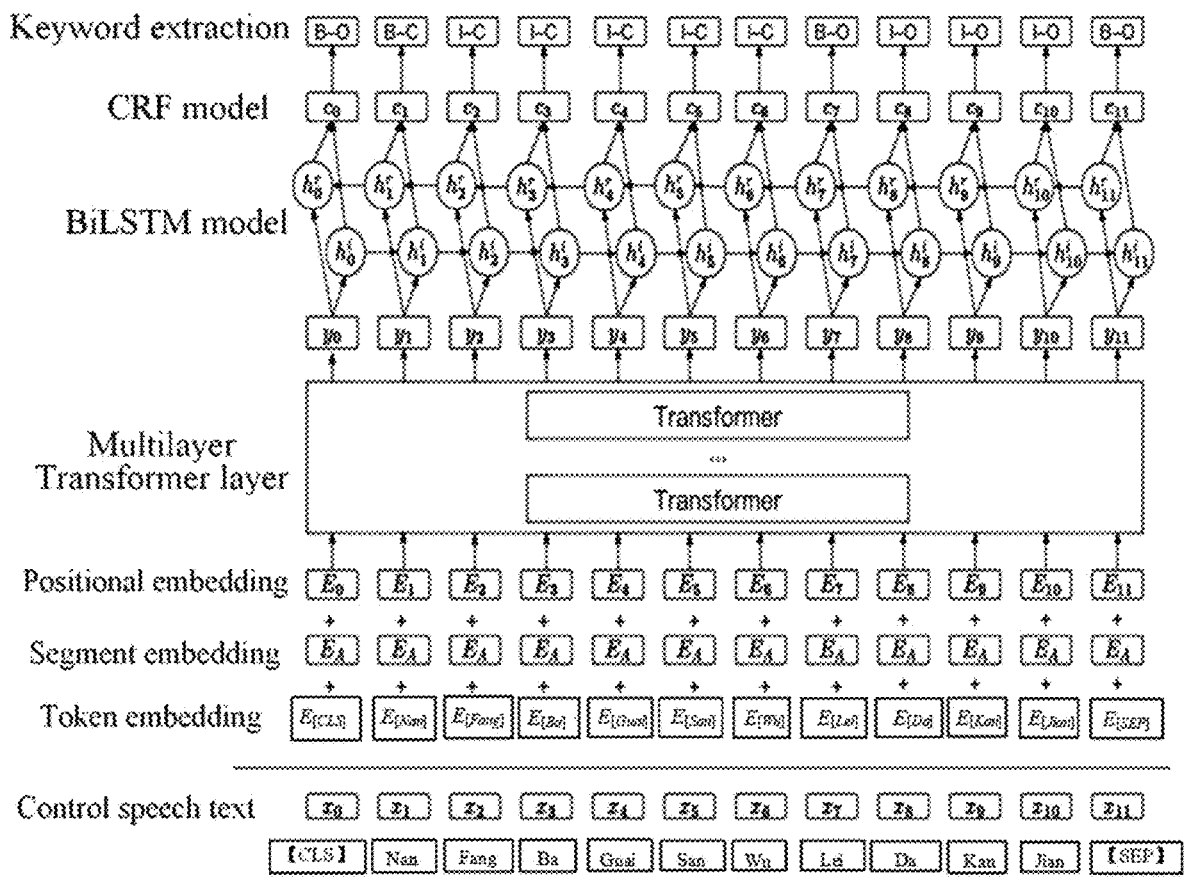
FIG. 3 is the structural diagram of BERT+BiLSTM+CRF model.

B. As shown in FIG. 3, the BERT+BiLSTM+CRF model will be trained by using the labeled control speech text historical data, and the trained model will be used to extract the control instruction keywords from the control speech text that changed the flight state after judgment. In keyword extraction, the output of BERT layer will be shared with the intention identification model of regulated speech text (BERT+TextCNN model), only the model of downstream tasks will be modified, and BERT+TextCNN model will be integrated with BERT+BiLSTM+CRF model, thus reducing unnecessary calculation process.

Figure 4:
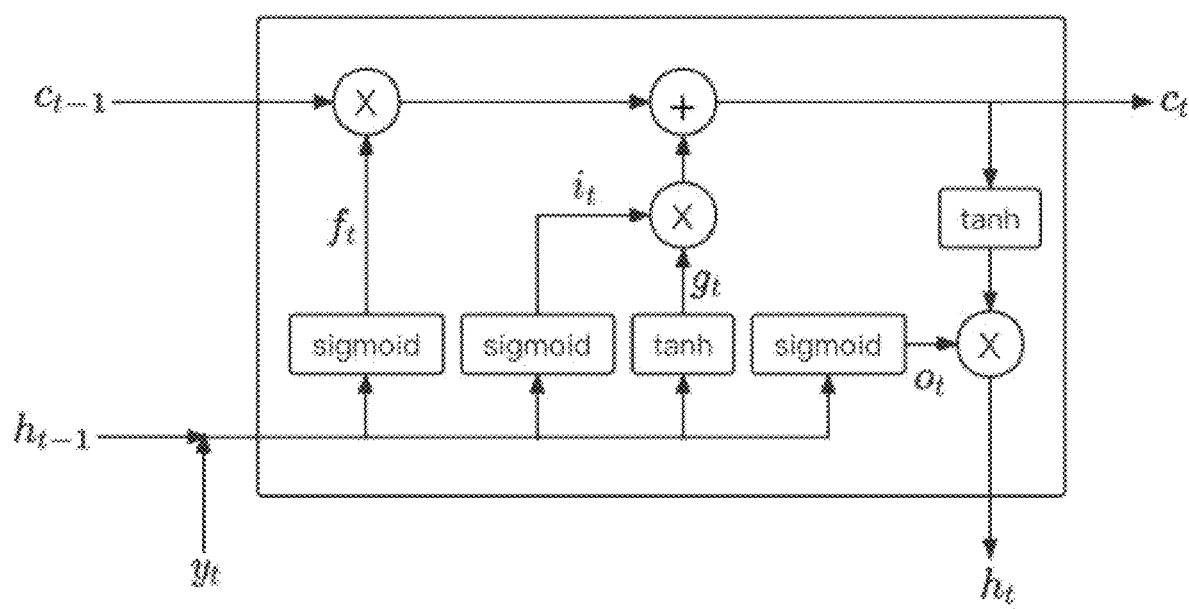
FIG. 4 is the specific work flow chart of LSTM.

The specific work flow of that disclosure is as follows:

a. BERT model output:

The $$X^m_{transformer}$$

output by BERT model in BERT+Text CNN model is spliced to obtain Y={$y_0, y_1, \ldots, y_t$}, Y={$y_0, y_1, \ldots, y_t$} is a series of vectors output by BERT model. Each vector packet contains the semantic information of the corresponding position in the input sequence, and Y={$y_0, y_1, \ldots, y_t$} is directly used for keyword extraction.

b. BiLSTM model processing:

Bi-LSTM is a kind of LSTM, which is composed of two-way LSTM. It is a combination of bidirectional recursive neural network and long-term and short-term memory neural network. At every moment t, the input will be provided to both the forward and backward neural networks, and the output will be determined by both the forward and backward neural networks. The specific work flow chart of LSTM is shown in FIG. 4.

The specific calculation process of the BiLSTM model is as follows:

forward calculation:

a memory unit stores historical information of sequence data together with a hidden state, and a forgetting gate $f_t$ decides to delete part of information in the memory unit according to a hidden state $h_{t-1}$ of a previous moment and an input vector $y_t$ of a current moment; a specific formula is as follows:

$$f_t = \sigma(W_f \cdot [h_{t-1}, y_t] + b_f);$$

where $\sigma$ represents sigmoid activation function; $W_f$ represents a weight of the forgetting gate; $b_f$ represents forgetting gate offset;

an input gate $i_t$ determines a candidate value controlled by an input gate $i_t$ according to the hidden state $h_{t-1}$ at the previous moment and the input vector $y_t$ at the current moment, and decides to update part of values in the memory unit; the specific formulas are as follows:

$$i_t = \sigma(W_i \cdot [h_{t-1}, y_t] + b_i);$$
$$g_t = \tanh(W_g \cdot [h_{t-1}, y_t] + b_g);$$

where $g_t$ denotes a candidate memory unit for updating the memory unit; $W_i$ and $W_g$ represent weights of the input gate respectively; $b_i$ and $b_g$ respectively represent input gate offset;

after the calculation of forgetting gate $f_t$ and input gate $i_t$ is completed, an old memory unit state $c_{t-1}$ is updated to a new memory unit state $c_t$, and a specific formula is:

$$c_t = f_t \circ c_{t-1} + i_t \circ g_t;$$

where $\circ$ is Hadamard product, and the Hadamard product is to multiply corresponding elements in the matrix.

The output gate $o_t$ determines which part of the unit state will be calculated as output according to $c_t$, $h_{t-1}$ and $y_t$, and outputs after tanh activation function. The specific formulas are as follows:

$$o_t = \sigma(W_{out} \cdot [h_{t-1}, y_t] + b_{out});$$
$$h_t = o_t \circ \tanh(c_t);$$

where $W_{out}$ represents a weight of the output gate; $b_{out}$ represents an output gate offset; $h_t$ indicates an output hidden state;

reverse calculation:

a process of the reverse calculation is to adjust a forward calculation index from time t to 1;

the final output of a BiLSTM model is a splicing of forward and reverse calculation H:

$$H = [\vec{h}_1, \vec{h}_2, \ldots, \vec{h}_t, \overleftarrow{h}_t, \overleftarrow{h}_{t-1}, \ldots, \overleftarrow{h}_1];$$

where $\vec{h}_t$ represents a result of the forward calculation and $\overleftarrow{h}$ represents a result of the reverse calculation;
c. CRF model processing:
c1) transition probability matrix:
the transition probability matrix represents the probability from one label to another, and a specific formula is as follows:

$$T_{u,v} = \exp(W_t[\vec{h}_v; \overleftarrow{h}_u] + b_t);$$

where $T_{u,v}$ represent the transition probability from label u to label v; $W_t$ and $b_t$ respectively represent model parameters of the transition probability matrix; [;] represents a splicing operation, exp represents an exponential function; $\vec{h}_v$ represents a hidden state of the forward calculation of the BiLSTM model at the label v; $\overleftarrow{h}$ represents a hidden state of the reverse calculation of the BiLSTM model at the label u;
c2) state scores matrix:
the state scores matrix represents a score of each label at each moment, and a specific formula is as follows:

$$S_{u,t} = W_s[\vec{h}_u; \overleftarrow{h}_u] + b_s;$$

where $S_{u,t}$ represent a state score of label u at time t; $\vec{h}_u$ represents a hidden state of the forward calculation of the BiLSTM model at the label u; $\overleftarrow{h}$ represents a hidden state of the reverse calculation of the BiLSTM model at the label u; $W_s$ and $b_s$ respectively represent model parameters of the state scores matrix; [;] represents the splicing operation; u represents an index of a label;
c) overall score matrix:
the overall score matrix represents a score of each label sequence and a possibility of a given label sequence; a specific formula is as follows:

$$O(\text{tags}) = \sum_{t=1}^{L} S_{tags_t,t} + \sum_{t=2}^{L} T_{tags_{t-1},tags_t}$$

where $tags_t$ represents a label at time t; $S_{tags_t,t}$ is the state scores matrix, $S_{tags_t,t}$ represents a score of the label $tags_t$ at time t; $T_{tags_{t-1},tags_t}$ is the transition probability matrix, which represents a transition probability of switching from label $tags_{t-1}$ to label $tags_t$; O(tags) is a total score of a given label sequence tags, indicating the possibility of the label sequence; L is a sequence length.
d. training and fine-tuning
Using the training data with keyword entity labels, the model parameters are adjusted by minimizing the loss function.

e. Inference
After fine-tuning, the adjusted BERT+BiLSTM+CRF model is used to infer the judged control speech text and obtain the label sequence of the corresponding control instruction keywords.
5) Aircraft Air Conflict Detection
Each minimum safety interval navigation section in the regional dispatching stage is abstracted as a resource in the computer system. For each route with minimum safety interval, a binary mark is introduced, and if the resource is occupied, it is labeled as 1; if it is not occupied, it is labeled as 0. After the route is abstracted as a computer resource, it may be quickly judged to confirm whether there is an aircraft air conflict. When the aircraft air conflict occurs, it may also be solved by using banker algorithm and other methods. The specific calculation process is as follows:
A, judging the occupancy information of all the minimum safety interval flight segments in a specific area through real-time radar data. The occupancy information updated every second marks the occupancy state of each minimum safety interval segment as 1 (occupied) or 0 (unoccupied). This real-time update ensures the system's timely perception of the airspace state.
B, when the controller releases the control speech that needs to change the flight state, the system extracts the keywords through the above steps. By judging the extracted keywords, the system determines the target segment that the plane is about to reach.
C, the ATC speech identification system judges the occupancy state of the target flight segment again according to the real-time updated occupancy information. If the target flight segment is occupied, the system will generate an air conflict alarm and notify relevant personnel immediately. On the other hand, if the target flight segment is not occupied, the aircraft air conflict detection is ended.

What is claimed is:
1. A system for detecting aircraft air conflict based on semantic parsing of control speech, wherein the system comprises an external speech acquisition equipment, which is embedded with a Bluetooth transmission module; a radar to collect real-time radar information, the system executes the following steps:
step 1: collecting control speech in real time, and combining with the real-time radar data, performing a speech-to-text processing on the control speech to identify a control speech text;
step 2: identifying a control speech text intention according to an identified control speech text, judging whether the identified control speech text intention needs to change a flight state of an aircraft, and if the flight state does not need to be changed, the detection is terminated; if the flight state needs to be changed, a next control instruction is extracted;
step 3: in a control instruction extraction stage, extracting key data needed by an aircraft air conflict detection algorithm from the identified control speech text; and
step 4: performing a calculation according to the key data and the real-time radar data and using the aircraft air conflict detection algorithm to judge whether the aircraft air conflict exists at present; if the aircraft air conflict is not detected, a whole process ends; if the aircraft air conflict exists, an aircraft air conflict warning mechanism is triggered to remind relevant personnel to take necessary measures;

step 2 specifically comprising:

step 2.1: classifying control speech text intentions in a zone adjustment stage, that is, in the process of air flight, and defining whether the control speech text intention needs to change the flight state of the aircraft to obtain a classification table of the control speech text intention;

step 2.2: annotating early collected and stored control speech text historical data according to the classification table of the control speech text intention, and using the annotated control speech text historical data to train a BERT+TextCNN model; using the trained BERT+TextCNN model to perform a control speech text intention identification on a control speech text to be identified;

the step 2.2 is specifically as follows:

step 2.2.1: inputting the control speech text for text preprocessing:

preprocessing a control speech text $X=[x_0, x_1, \ldots,]$, comprising converting into token embeddings, positional embeddings and segment embeddings, and finally adding the token embeddings, the positional embeddings and the segment embeddings to obtain a combined embedding;

the token embeddings: mapping each word or sub-word into the token embeddings;

$$E_e = E[index(x_i)];$$

wherein $E_e$ represents the token embeddings; $x_i$ represents the word or the sub-word in the control speech text; index represents an index that the word or the sub-word $x_i$ in the control speech text is mapped to a token embedding matrix; E represents the token embedding matrix, wherein each row corresponds to a word vector representation of the word or the sub-word;

the positional embeddings: considering position information of the word, adding the positional embedding;

$$E_p = P[x_i];$$

wherein $E_p$, represents the positional embeddings; P represents a positional embedding matrix, wherein each row corresponds to a position vector representation of a position; the segment embedding: distinguishing different paragraphs or sentences input in the control speech text;

$$E_s = S[segment\_index(X)];$$

wherein $E_s$ represents the segment embeddings; S represents a segment embedding matrix, wherein each row corresponds to a segment vector representation of a segment; segment_index represents a function for accepting input control speech text X and returning a segment index to which each word or the sub-word belongs;

combined embedded representation:

$$X_{incoder} = E_e + E_p + E_s;$$

wherein $X_{incoder}$ represents the combined embeddings;

step 2.2.2: BERT model processing:

inputting a preprocessed control speech text into a BERT model to obtain a context-aware vector representation; the BERT model comprises a plurality of Transformer layers, and each layer comprises a multi-head self attention mechanism and a feedforward neural network;

a) multi-head self attention mechanism:

in the multi-head self attention mechanism, each input word is associated with other words, and a weight is determined by an attention score; the multi-head self attention mechanism captures different relationships through a plurality of attention heads, as the following formulas:

$$\text{Attention}(Q, K, V) = \text{softmax}\left(\frac{QK^T}{\sqrt{d_k}}\right) \cdot V$$

$$X_{head}^i(X) = \text{Attention}(X \cdot W_{Q_i}, X \cdot W_{K_i}, X \cdot W_{V_i})$$

$$X_{MultiHead}(X) = \text{Concat}(X_{head}^1(X), X_{head}^2(X), \ldots, X_{head}^i(X)) * W_O$$

wherein $Q = X \cdot W_Q$, $K = X \cdot W_K$, $V = X \cdot W_V$ respectively represent matrices of query, key and value about the input vector control speech text; softmax represents an activation function; $W_Q$, $W_K$, $W_V$ respectively represent weight matrices of the query, the key and the value; $d_k$ represents a dimension of each attention head; $W_O$ represents a weight matrix of a fully connected layer; T represents a transposed symbol; $X_{head}^i$ represents an output result of an i-th self attention mechanism; Attention represents self attention operation; $W_{Q_i}$, $W_{K_i}$, $W_{V_i}$ respectively represent weight matrices of query, key and value in the i-th self attention mechanism;

$X_{MultiHead}(X)$ represents an output of self attention mechanism, Concat represents a connection operation; * indicates a convolution operation;

b) the feedforward neural network:

after the multi-head self attention mechanism, nonlinear mapping is performed on the output by the feedforward neural network:

$$FFN(X) = \text{ReLU}(X_{MultiHead}(X) \cdot W_1 + b_1) \cdot W_2 + b_2;$$

wherein FFN represents the output through the feedforward neural network; ReLU represents an activation function; $X_{MultiHead}(X)$ represents the output of the self attention mechanism; $W_1$ and $W_2$ respectively represent weight matrices of the feedforward neural network; $b_1$ and $b_2$ respectively represent offset vectors of the feedforward neural network;

a final BERT model output is:

$$X_{transformer}^1 = FNN(X_{incoder})$$

$$X_{transformer}^m = FNN(X_{transformer}^{m-1})$$

wherein $X_{transformer}^m$ represents an output of an m-th Transformer;

step 2.2.3: TextCNN model:

inputting an output result of the BERT model into the TextCNN model; the TextCNN model comprises a convolution layer, a pooling layer and the fully connected layer;

a) convolution layer operation:

$$c_k = ReLU(W * X_{transformer}^{[k:k+h-1]} + b);$$

wherein $c_k$ represents a convolution result, W represents a convolution kernel; b represents an offset vector of the convolution operation; $X_{transformer}^{[k:k+h-1]}$ represents a sliding window operation on an output of the Transformer layers; for each position k in an output sequence of the Transformer layer, a subsequence from a position k to a position k+h−1 is extracted as an input of the convolution operation; h represents a size of a sliding window;
b) pooling layer operation:

$$p_k = \max(c_{k:k+h-1})$$

wherein $p_k$ represents a result of the pooling operation; max represents the pooling operation; $c_{k:k+h-1}$ represents an output result of the convolution layer; k:k+h−1 represents a local area from the position k to k+h−1
c) combining results of all pooling layer operations into a feature vector p:

$$p = [p_1, p_2, \ldots, p_{n-h+1}];$$

wherein $p_{n-h+1}$ represents a result of a last pooling operation; n represents a length of an input sequence; h represents a size of the sliding window, that is, features extracted from a sliding window starting from an h-th position from a bottom of the input sequence;
d) fully connected layer:
inputting the feature vector p into the fully connected layer to obtain:

$$y = \mathrm{softmax}(W_{FC} \cdot p + b_{FC});$$

wherein y represents an output of the fully connected layer; $W_{FC}$ represents a weight matrix of the fully connected layer; $b_{FC}$ represents an offset vector of the fully connected layer;
step 2.2.4: training and fine-tuning:
using training data with a control speech text intention label, adjusting parameters of the BERT+TextCNN model by minimizing a loss function;

$$\mathcal{L} = -\Sigma_i \Sigma_j y_{i,j} \log(\hat{y}_{i,j})$$

wherein $\mathcal{L}$ represents a cross entropy loss; $y_{i,j}$ represents a real label; $\hat{y}_{i,j}$ represents a prediction probability of the BERT+TextCNN model;
step 2.2.5: inference:
after completing the fine-tuning, using an adjusted BERT+TextCNN model to perform the inference on the control speech text identified in the step 1 to obtain a corresponding control speech text intention classification result;
step 2.3: after obtaining the control speech text intention, judging whether to change the flight state according to the classification table of the control speech text intention, if the flight state does not need to be changed, the detection is terminated; if the flight state needs to be changed, the next control instruction is extracted;
the aircraft air conflict detection algorithm in step 4 specifically comprises the following steps:
step 4.1: judging occupancy information of all minimum safety interval flight segments in a specific area through real-time radar data; marking an occupancy state of each of the minimum safety interval flight segments: occupied is labeled as 1, unoccupied is labeled as 0, and the occupancy information is updated once every second;
step 4.2: when a controller releases a control speech needing to change the flight state, performing a keyword extraction, and determining a target flight segment for an impending arrival of the aircraft by judging extracted keywords; and step 4.3: judging the occupancy state of the target flight segment again according to the occupancy information updated in real time; wherein if the target flight segment is occupied, an aircraft air conflict alarm is generated and relevant personnel are notified immediately; on the contrary, if the target flight segment is not occupied, an aircraft air conflict detection is ended.

2. The system for detecting aircraft air conflict based on the semantic parsing of the control speech according to claim 1, wherein the control instruction extraction in the step 3 specifically comprises:
step 3.1: after identifying and judging the control speech text intention, performing a keyword extraction on a control speech text changing the flight state; according to a structure of the control speech text, designing four types of keyword entities for the control speech text, namely call sign entity, instruction entity, numeral entity and quantifier entity; labeling the control speech text historical data collected and stored in an early stage by using a BIO-labeling method; and
step 3.2: training a BERT+BILSTM+CRF model with labeled control speech text historical data; using trained BERT+BILSTM+CRF model to extract the control instruction keywords from the control speech text changing the flight state after the judging.

3. The system for detecting aircraft air conflict based on the semantic parsing of the control speech according to claim 2, wherein the step 3.2 specifically comprises:
step 3.2.1: BERT model output:
$Y = \{y_0, y_1, \ldots, y_t\}$ output by the BERT model in the BERT+TextCNN model is directly used for keyword extraction;
step 3.2.2: BiLSTM model processing:
a) forward calculation:
a memory unit stores historical information of sequence data together with a hidden state, and a forgetting gate $f_t$ decides to delete part of information in the memory unit according to a hidden state $h_{t-1}$ of a previous moment and an input vector $y_t$ of a current moment; a specific formula is as follows:

$$f_t = \sigma(W_f \cdot [h_{t-1}, y_t] + b_f);$$

wherein $\sigma$ represents sigmoid activation function; $W_f$ represents a weight of the forgetting gate; $b_f$ represents forgetting gate offset;
an input gate it determines a candidate value controlled by an input gate it according to the hidden state $h_{t-1}$ at the previous moment and the input vector $y_t$ at the current moment, and decides to update part of values in the memory unit; the specific formulas are as follows:

$$i_t = \sigma(W_i \cdot [h_{t-1}, y_t] + b_i);$$

$$g_t = \tanh(W_g \cdot [h_{t-1}, y_t] + b_g);$$

wherein $g_t$ denotes a candidate memory unit for updating the memory unit; $W_i$ and $W_g$ represent weights of the input gate respectively; $b_i$ and $b_g$ respectively represent input gate offset; tanh represents an activation function;
after the calculation of forgetting gate $f_t$ and input gate $i_t$ is completed, an old memory unit state $c_{t-1}$ is updated to a new memory unit state $c_t$, and a specific formula is:

$$c_t = f_t \circ c_{t-1} + i_t \circ g_t;$$

wherein $\circ$ is a Hadamard product, and the Hadamard product is to multiply corresponding elements in the matrix;

the output gate $o_t$ determines an output of a unit state according to a new memory unit state $c_t$, the hidden state $h_{t-1}$ at the previous moment and the input vector $y_t$ at the current moment, and outputs after tanh activation function; specific formulas are:

$$o_t = \sigma(W_{out} \cdot [h_{t-1}, y_t] + b_{out});$$

$$h_t = o_t \circ \tan h(c_t);$$

wherein $W_{out}$ represents a weight of the output gate; $b_{out}$ represents an output gate offset; $h_t$ indicates an output hidden state;

b) reverse calculation:
a process of the reverse calculation is to adjust a forward calculation index from time t to 1;

c) final output:
the final output of a BiLSTM model is a splicing of forward and reverse calculation H:

$$H = [\vec{h}_1, \vec{h}_2, \ldots, \vec{h}_t, \overleftarrow{h}_t, \overleftarrow{h}_{t-1}, \ldots, \overleftarrow{h}_1];$$

wherein $\vec{h}_t$ represents a result of the forward calculation and $\overleftarrow{h}_t$ represents a result of the reverse calculation;

step 3.2.3: CRF model processing:
a) transition probability matrix:
the transition probability matrix represents the probability from one label to another label, and a specific formula is as follows:

$$T_{u,v} = \exp(W_t[\vec{h}_v; \overleftarrow{h}_u] + b_t);$$

wherein $T_{u,v}$ represents the transition probability from label u to label v; $W_t$ and $b_t$ respectively represent model parameters of the transition probability matrix; [;] represents a splicing operation, exp represents an exponential function; $\vec{h}_v$ represents a hidden state of the forward calculation of the BiLSTM model at the label v; $\overleftarrow{h}_u$ represents a hidden state of the reverse calculation of the BiLSTM model at the label u;

b) state scores matrix:
the state scores matrix represents a score of each label at each moment, and a specific formula is as follows:

$$S_{u,t} = W_s[\vec{h}_u; \overleftarrow{h}_u] + b;$$

wherein $S_{u,t}$ represents a state score of label u at time t; $\vec{h}_u$ represents a hidden state of the forward calculation of the BiLSTM model at the label u; $\overleftarrow{h}_u$ represents a hidden state of the reverse calculation of the BiLSTM model at the label u; $W_s$ and $b_s$ respectively represent model parameters of the state scores matrix; [;] represents the splicing operation; u represents an index of a label;

c) overall score matrix:
the overall score matrix represents a score of each label sequence and a possibility of a given label sequence; a specific formula is as follows:

$$O(\text{tags}) = \sum_{t=1}^{L} S_{tags_t, t} + \sum_{t=2}^{L} T_{tags_{t-1}, tags_t}$$

where $tags_t$ represents a label at time t; $S_{tags_t, t}$ is the state scores matrix, $S_{tags_t, t}$ represents a score of the label tags, at time t; $T_{tags_{t-1}, tags_t}$ is the transition probability matrix, which represents a transition probability of switching from label $tags_{t-1}$ to label $tags_t$; O(tags) is a total score of a given label sequence tags, indicating the possibility of the label sequence; L is a sequence length;

step 3.2.4: training and fine-tuning:
using training data with keyword entity labels, adjusting parameters of the BERT+BiLSTM+CRF model by minimizing the loss function;

step 3.2.5: inference:
after the fine-tuning, using an adjusted BERT+BiLSTM+CRF model to perform the inference on a judged control speech text and obtain a label sequence of corresponding control instruction keywords.

\* \* \* \* \*